United States Patent
Bourbiaux et al.

(10) Patent No.: US 11,339,630 B2
(45) Date of Patent: May 24, 2022

(54) METHOD FOR RECOVERY OF HYDROCARBONS IN A GEOLOGICAL RESERVOIR BY LOW-SALINITY WATER FLOODING

(71) Applicant: IFP Energies nouvelles, Rueil-Malmaison (FR)

(72) Inventors: Bernard Bourbiaux, Rueil-Malmaison (FR); Quang Long Nguyen, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 432 days.

(21) Appl. No.: 16/675,602

(22) Filed: Nov. 6, 2019

(65) Prior Publication Data
US 2020/0141212 A1 May 7, 2020

(30) Foreign Application Priority Data
Nov. 6, 2018 (FR) ..................... 18/60.212

(51) Int. Cl.
*E21B 43/20* (2006.01)
*G01N 33/24* (2006.01)
*C09K 8/58* (2006.01)
*E21B 41/00* (2006.01)
*G06F 30/20* (2020.01)
(Continued)

(52) U.S. Cl.
CPC .......... *E21B 41/0092* (2013.01); *E21B 43/20* (2013.01); *E21B 47/06* (2013.01); *G06F 30/20* (2020.01); *G06F 2111/10* (2020.01)

(58) Field of Classification Search
CPC .......... E21B 43/20; G01N 33/241; C09K 8/58
See application file for complete search history.

(56) References Cited

U.S. PATENT DOCUMENTS

| 8,739,869 B2* | 6/2014 | Willingham | E21B 43/20 166/266 |
| 9,982,520 B2* | 5/2018 | Collins | E21B 43/20 |
| 10,711,178 B2* | 7/2020 | Chaalal | C09K 8/584 |

(Continued)

OTHER PUBLICATIONS

Preliminary Search Report for FR 18/60.212, dated Oct. 9, 2019.
(Continued)

*Primary Examiner* — Kenneth L Thompson
(74) *Attorney, Agent, or Firm* — Fitch, Even, Tabin & Flannery LLP

(57) ABSTRACT

The invention relates to a method for recovery of hydrocarbons in a geological reservoir by injection of a low-salinity aqueous solution. A representative model of the evolution of the flow parameters as a function of the aqueous solution salinity is calibrated by use of laboratory measurements performed on a rock sample from the reservoir for at least two salinity values. Then, by use of a flow simulator including the calibrated model, the injection of aqueous solutions into the sample is simulated, with and without capillary effects, for at least the two salinity values with a microscopic residual oil saturation being determined for each salinity value. Then, from the flow simulator including the calibrated model and the microscopic residual oil saturation values, a reservoir development scheme is determined with hydrocarbons of the reservoir being exploited according to the development scheme.

21 Claims, 1 Drawing Sheet

(51) Int. Cl.
 *E21B 47/06* (2012.01)
 *G06F 111/10* (2020.01)

(56) References Cited

U.S. PATENT DOCUMENTS

| | | | |
|---|---|---|---|
| 10,815,777 B2* | 10/2020 | Collins | G01N 33/2823 |
| 11,002,122 B1* | 5/2021 | Couves | C09K 8/584 |
| 2015/0233223 A1* | 8/2015 | AlAmeri | C09K 8/584 |
| | | | 166/305.1 |
| 2017/0234126 A1 | 8/2017 | Al-Shalabi et al. | |

OTHER PUBLICATIONS

Emad Waleed Al-Shalabi et al: "Mysteries behind the Low Salinity Water Injection Technique", Journal of Petroleum Engineering, vol. 2014, (Jan. 1, 2014), pp. 1-11, XP055630203.

Etemadi A Rash et al: Modelling low-salinity waterflooding: Effect of divalent cations and capillary pressure, Journal of Petroleum Science and Engineering, vol. 149, (Oct. 6, 2016), pp. 1-8, XP029877500.

A. Jahanbani Ghahfarokhi et al: "Numerical Simulation of Low Salinity Water Flooding: Wettability Alteration Considerations",ECMOR XVI, 16th European Conference on the Mathematics of Oil Recovery,Sep. 3, 2018 (Sep. 3, 2018), XP055629636.

Hasan Al-Ibadi et al: "An Updated Fractional Flow Model of Low Salinity Water Flooding with Respect to the Impact of Salt Diffusion", SPE Trinidad and Tobago Section Energy Resources Conference, (Jan. 1, 2018), XP055629692.

\* cited by examiner

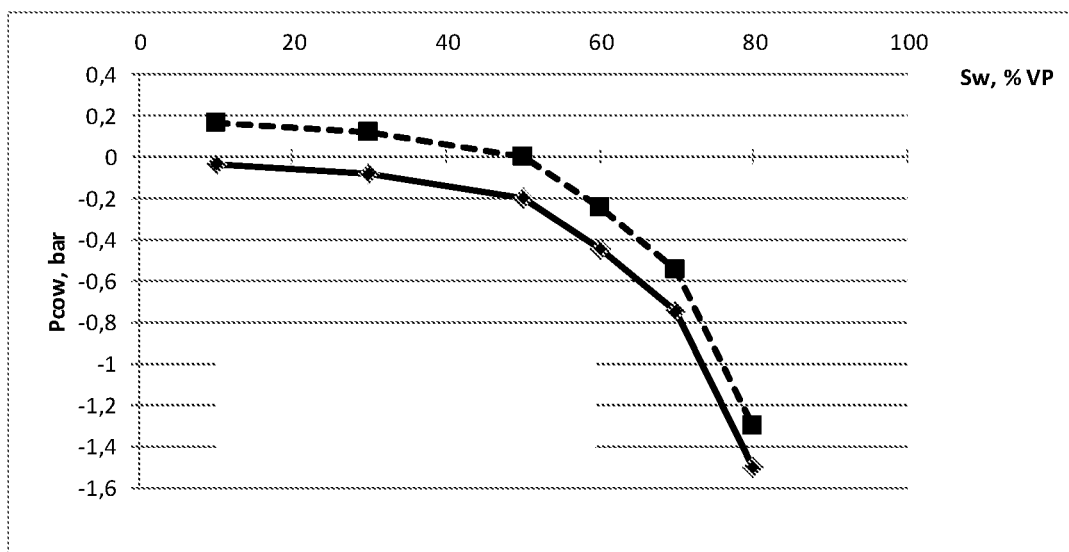

METHOD FOR RECOVERY OF HYDROCARBONS IN A GEOLOGICAL RESERVOIR BY LOW-SALINITY WATER FLOODING

CROSS REFERENCE TO RELATED APPLICATIONS

Reference is made French Application No. 18/60.212 filed Nov. 6, 2018, which is incorporated herein by reference in its entirety.

BACKGROUND OF THE INVENTION

Field of the Invention

The present invention relates to the exploitation of hydrocarbons contained in a geological reservoir, more particularly to the enhanced recovery of such hydrocarbons by injection of a saline aqueous solution referred to as low-salinity solution.

Description of the Prior Art

Development of a petroleum reservoir by primary recovery consists in extracting, via a so-called production well, the oil present in the reservoir via the overpressure naturally prevailing within the reservoir. This primary recovery only enables access to a small amount of the oil contained in the reservoir, of the order of 10% to 15% at most.

To enable the continuation of oil extraction, secondary production methods are implemented when the reservoir pressure becomes insufficient to displace the oil still in place. Notably, a fluid is injected (reinjection of produced water, diluted or not, seawater or river water injection, or gas injection for example) into the hydrocarbon reservoir so as to exert within the reservoir an overpressure likely to cause the oil to flow into the production well(s). A usual technique in this context is water injection, also referred to as water flooding, where large volumes of water are injected under pressure into the reservoir via injection wells. The injected water drives part of the oil encountered and pushes it towards one or more production wells. Secondary production methods such as water flooding however allow only a relatively small part of the hydrocarbons in place to be extracted (typically of the order of 30%). This partial sweep is notably due to oil entrapment by capillary forces, to viscosity and density differences between the injected fluid and the hydrocarbons in place, and to heterogeneities at microscopic or macroscopic scales (pore scale and reservoir scale).

Industrialists have expressed strong interest in a hydrocarbon recovery method using low-salinity or smart water flooding in recent years. Indeed, the process is easy to implement, inexpensive (desalination costs essentially), and it has proven to be particularly effective for the recovery of oil trapped in the pores of a geological reservoir.

The following documents are mentioned in the description hereafter:

Jackson, M. D., Vinogradov, J., Hamon, G., Chamerois, M. (2016) Evidence, entitled Mechanisms and Improved Understanding of Controlled Salinity Waterflooding Part 1: Sandstones, *Fuel* 185, 772-793.

Jerauld, G. R., Lin, C. Y., Webb, K. J. and Seccombe, J. C. (2008) Modeling Low-Salinity Waterflooding, *SPE Reservoir Evaluation & Engineering*, 1000-1012, December.

Skauge, A. (2013) Low Salinity Flooding—A Critical Review, paper A11 presented at the 17th European Symposium on IOR, 16-18 Apr. 2013.

Yousef, A. A., Al-Saleh, S., Al-Kaabi, A. and Al-Jawfi, M. (2011) Laboratory Investigation of the Impact of Injection-Water Salinity and Ionic Content on Oil Recovery From Carbonate Reservoirs, paper SPE 137634, *SPE Reservoir Evaluation & Engineering Journal*, 14(5), 578-593.

As mentioned in the document (Jackson et al., 2016), the physical mechanisms involved in "Low-Sal" (low-salinity) methods remain poorly understood, although many studies have been conducted and much data has been acquired. Therefore, the industry has no injection water optimization method for a given reservoir rock-fluid system.

However, it is now an acknowledged fact that the effects of salinity reduction on the recovery of oil in place can be seen as the consequence of a porous media wettability alteration. Now, porous media wettability impacts the input data of the displacement models for the fluids in place in a reservoir, such as the relative permeabilities (kr) and the capillary pressures (Pc), which are a function of saturation.

Various models, more or less complex, which account for an evolution of these parameters (kr, Pc) as a function of salinity have thus been constructed. Construction of these models requires measurements performed in the laboratory (on core samples taken from the reservoir or a geological analog), from which the parameters of the models, which can be numerous, are calibrated.

The document (Jerauld et al., 2008) discloses a modified two-phase model for reproducing the effects of salinity. It provides, in form of a table, a variation law (linear decline by default) of the residual oil saturation $S_{orw}$ with the salinity between two maximum (HS: High Salinity) and minimum (LS: Low Salinity) bounds, and in defining two sets of capillary pressure and relative water and oil permeability curves corresponding to each of these two HS and LS salinity bounds. At a given salinity, the relative permeability and capillary pressure values are linearly interpolated between the kr and Pc curves at high and low LS as a function of a salinity variable $\theta$.

More precisely, in this document, the values of kr and Pc at any given oil saturation $S_o$ and at any salinity for which the residual oil saturation is $S_{orw}$ are determined as follows:

$$k_{rw} = \theta k_{rw}^{HS}(S^*) + (1-\theta)k_{rw}^{LS}(S^*)$$

$$k_{row} = \theta k_{row}^{HS}(S^*) + (1-\theta)k_{row}^{LS}(S^*)$$

$$P_{row} = \theta P_{row}^{HS}(S^*) + (1-\theta)P_{row}^{LS}(S^*)$$

where interpolation variable $\theta$ is defined as:

$$\theta = \frac{S_{orw} - S_{orw}^{LS}}{S_{orw}^{HS} - S_{orw}^{LS}}$$

and S* is the current normalized oil saturation defined as:

$$S^* = \frac{S_o - S_{orw}}{1 - S_{wi} - S_{orw}}$$

and where $S_{wi}$ is the irreducible water saturation.

Such models can be used to assess the effectiveness of a method for recovery of the oil in place in a geological reservoir by injection of a low-salinity aqueous solution, notably by estimating the evolution of the amount of residual oil remaining trapped in the pores of a geological reservoir as a function of salinity. Thus, an oil recovery method will be all the more effective as the residual oil saturation after saline water flooding is low.

However, the fluid systems considered (water-oil) are immiscible fluids of high interfacial tension (of the order of ten to several ten mN/m), which consequently induces capillary effects that may be noticeable at the scale of small-size core samples. More precisely, the capillary effects lead to a wetting fluid retention at the core outlet. Therefore, the oil production measurements at the core outlet give access to an average residual oil saturation (denoted by $S_{orw}^{carotte}$ hereafter) and not to the true microscopic residual saturation (denoted by $S_{orw}$ hereafter) that is actually the essential information sought as a function of the injected water salinity. These capillary effects are mentioned in the document (Skauge, 2013), which recommends local (in-situ) saturation measurements, which are long and difficult to implement, since directly in the geological reservoir.

Thus, the current models are not reliable enough to predict the effectiveness of a low-salinity water flooding process in terms of oil recovery and/or they require in-situ measurements that are long and difficult to implement, and therefore expensive.

SUMMARY OF THE INVENTION

The present invention has a goal of overcoming these drawbacks. The present invention thus relates to a method allowing reliable prediction of the residual oil saturation, via the microscopic residual oil saturation, as a function of the salinity of an aqueous solution injected into a geological reservoir, in order to select a salinity optimizing the recovery of the oil in place. The present invention therefore combines laboratory measurements, in a limited number, simple and rapid, and numerical simulations for calibrating a representative model of the evolution of the microscopic residual oil saturation as a function of the salinity injected.

The present invention relates to a method for recovery of hydrocarbons present in a geological reservoir by injection of a saline aqueous solution into the reservoir, by use of a numerical flow simulator including a representative model of evolution of the flow parameters as a function of the salinity of the injected aqueous solution, the flow parameters comprise at least a residual oil saturation, a relative water permeability, a relative oil permeability and a capillary pressure, with the model being a function of constants relative to each of the parameters, wherein:

A—from at least one sample representative of the reservoir, the at least one sample having been restored to its initial state, the model being calibrated according to at least the following steps:
  i. injecting into the at least one sample at least two aqueous solutions having different salinity values, and measuring at least an oil production and a pressure drop for each of the salinity values;
  ii. performing capillary pressure measurements for at least each of the salinity values; and
  iii. from the measurements, determining the constants of said model relative to each of said parameters;

B—by use of the simulator including the calibrated model, a microscopic residual oil saturation value is determined for at least the salinity values by applying at least the following steps for each of the salinity values:
  iv. carrying out a first simulation of an injection of an aqueous solution for the salinity value in the sample, the model being applied for the first simulation with a zero capillary pressure, and determining a first value of the residual oil saturation for the salinity value;
  v. carrying out a second simulation of an injection of an aqueous solution for the salinity value in the sample, and determining a second value of the residual oil saturation for the salinity value,
  vi. at least from the first and second residual oil saturation values simulated for the salinity value, determining the value of the microscopic residual oil saturation for the salinity value; and C—from the flow simulator including the calibrated model and the microscopic residual oil saturation values determined for at least the salinity values, determining a development scheme for the reservoir and exploiting the hydrocarbons of the reservoir according to the development scheme.

According to an implementation of the invention, the model can be expressed with a formula:

$$G(V)=[F(V)]^{\beta_G}G^{mod}+(1-[F(V)]^{\beta_G})G^{ini}$$

where G is one of the flow parameters of the model, V is the salinity, $G^{mod}$, $G^{ini}$ and $\beta_G$ are the constants of the model to be calibrated for the parameter, wherein G can also be a function of a water saturation when G corresponds to the relative water permeability, the relative oil permeability or the capillary pressure.

According to an implementation of the invention, the microscopic residual oil saturation value $S_{orw}$ for one of the salinity values can be determined with a formula:

$$S_{orw} = \frac{(2S_{orw}^{SIM} - S_{orw}^{carotte\text{-}SIM})(1-S_{wi}) - (S_{orw}^{SIM})^2}{(1-S_{wi} - S_{orw}^{carotte\text{-}SIM})},$$

where $S_{orw}^{SIM}$ is the first residual oil saturation value simulated for the salinity value, $S_{orw}^{carotte\text{-}SIM}$ is the second residual oil saturation value simulated for the salinity value, and $S_{wi}$ is an irreducible water saturation.

According to an implementation of the invention, the flow parameters can further comprise an irreducible water saturation and an irreducible water saturation measurement can further be performed for at least each of the salinity values from the sample.

According to an implementation of the invention, the development scheme can be determined by evaluating a plurality of development schemes as a function of at least one predetermined criterion, the evaluation comprising aqueous solution injection simulations for different salinity values in the reservoir, and the hydrocarbons of the reservoir being exploited according to the scheme meeting the criterion.

According to an implementation of the invention, the hydrocarbons of the reservoir can be exploited by injecting the saline aqueous solution, by drilling at least one injection well and at least one production well of the development scheme, and by installing production infrastructures suited to the development of the reservoir.

BRIEF DESCRIPTION OF THE FIGURES

Other features and advantages of the method according to the invention will be clear from reading the description hereafter of embodiments given by way of non limitative example, with reference to the accompanying FIGURES wherein:

FIG. 1 shows an example of capillary pressure curves in the case of an initial salinity and in the case of a modified salinity.

DETAILED DESCRIPTION OF THE INVENTION

In general terms, the invention is a method for recovery of hydrocarbons present in a geological reservoir by injecting a saline aqueous solution into the geological reservoir that is being studied.

The method according to the invention requires at least one sample representative of the petroleum reservoir being considered, taken by in-situ core drilling for example, or from a geological analog. According to the invention, the rock sample(s) used for implementing the method of the invention are restored to their initial state, which is as they were in the geological reservoir being studied. According to an implementation of the invention, the sample(s) are thus saturated with fluids present in the geological reservoir being studied (oil and irreducible water). Advantageously, the connate saturation is therefore measured beforehand. Such a saturation can for example be known by use of logs recorded in situ, in the geological reservoir being studied, or by measuring the water content of a core sample extracted by drilling this reservoir and which is preserved. It is noted that a distinction is made in principle between the connate saturation and the irreducible water saturation, which is the minimum water saturation obtained in the laboratory by oil drainage. However, the irreducible water saturation and the connate saturation can generally be expected to be equal or very close, because the oil accumulation process over geologic times is identical to the one simulated in the laboratory (drainage of an initially water-saturated reservoir by the oil migrating through this reservoir). The connate saturation is considered to be equal to the irreducible water saturation and it is denoted by $S_{wi}$ hereafter.

According to a design of the invention, restoring a rock sample from the geological reservoir being studied to its initial state is done by a method which saturates with water a vacuum sample of pore volume VP, then in displacing the water in place in this sample with oil by use of an injection pump or by centrifuging in oil, while ensuring that the volume of water of the sample produced $E_{prod}$ and thus is replaced by oil yields an irreducible water saturation value of the sample (denoted by $S_w$) close to the connate saturation value $S_{wc}$ measured upstream from the method according to the invention, which is $$S_{wi} = \frac{VP - E_{prod}}{VP} \approx S_{wc}.$$

Finally, once saturated with oil and irreducible water, this or these sample(s) are "aged" at the reservoir temperature to restore their original wettability. The aging procedure can leave the saturated samples within an oven at the reservoir temperature for weeks.

The method further requires a numerical flow simulator based on a representative model of the flow parameters evolution which is a function of the salinity of an aqueous solution injected into the geological reservoir being studied. According to the invention, the salinity-dependent flow parameters include at least the residual oil saturation $S_{orw}$, the relative permeabilities to water $k_{rw}$ and to oil $k_{ro}$ (which in addition depend on the saturation denoted by $S_w$ for the aqueous phase (brine) and $S_o$ for the hydrocarbon (oil) phase), and the capillary pressure of the water-oil pair $P_{cow}$ (which also depends on the saturation). According to an implementation of the invention, the salinity-dependent flow parameters further include the irreducible water saturation $S_{wi}$. This embodiment can be advantageously used when the irreducible water saturation $S_{wi}$ varies significantly with the salinity.

By way of non-limitative example, a flow simulator for implementing the method according to the invention predicts the impact of a change in salinity on the flow parameters from values of these known parameters for at least two salinity values of the injection water which are a value referred as "initial" (identified by subscript "ini" hereafter) and a value referred to as "modified" (identified by subscript "mod" hereafter). The flow simulator according to the invention predicts the values of the flow parameters $S_{orw}$, $k_{rw}$, $k_{ro}$ and $P_{cow}$ (and optionally $S_{wi}$), advantageously for a salinity value referred to as "intermediate" hereafter, from at least the initial and modified salinity values provided at the simulator input. By way of non-limitative example, what is referred to as "initial salinity" hereafter, is the highest salinity value corresponding to the salinity of the injection water available near the field (such as seawater), and what is referred to as "modified salinity" which is a reduced salinity in relation to the initial salinity. Advantageously, the value selected for the "modified salinity" can correspond to a salinity value below which oil recovery no longer increases which is, a salinity value below which the residual oil saturation no longer decreases.

By way of non-limitative example, the representative model of the flow parameters evolution as a function of salinity represents the salinity of the aqueous solution injected into the geological reservoir studied by a function F(V) where V is a representative parameter of the salinity of the solution. According to an implementation of the invention, V can be, by way of non-limitative example:

the concentration in salts present in the solution which is advantageously, a function F(V) that can be defined by a normalized salt concentration with a formula:

$$F(V) = \frac{Sal_{ini} - Sal}{Sal_{ini} - Sal_{mod}},$$

where Sal, $Sal_{ini}$, $Sal_{mod}$ are the intermediate, initial and modified salt concentrations respectively, the composition of ions present in the solution are advantageously, a function F(V) that can be defined via the normalized value of the square root of the ionic strength of the brine, with a formula:

$$F(V) = \frac{\sqrt{I_{ini}} - \sqrt{I}}{\sqrt{I_{ini}} - \sqrt{I_{mod}}},$$

where I, $I_{ini}$, $I_{mod}$ are the intermediate, initial and modified ionic strengths respectively, ionic strength I being defined as $$I = \frac{1}{2} \sum_j v_{wj} V_j^2,$$

where $V_j$ is the valence of ion j present in solution at the molar concentration $v_{wj}$.

According to the invention, the representative model of the evolution of flow parameters as a function of salinity is a function of constants relative to salinity, which need to be calibrated for each geological reservoir being studied.

According to an implementation of the invention, a representative model of the evolution of the flow parameters G can be used which is a function of salinity V defined with a formula:

$$G(V)=[F(V)]^{\beta_G}G^{mod}+(1-[F(V)]^{\beta_G})G^{ini}$$

with $G=\{S_{wi}, S_{orw}, k_{rw}, k_{ro}, P_{cow}\}$, and where $G^{mod}$ and $G^{ini}$ represent the values of parameter G for the initial and modified salinity values and $\beta_G$ is an exponent, and G being in addition a function of the water saturation when $G=\{k_{rw}, k_{ro}, P_{cow}\}$.

More precisely, according to this implementation of the invention, the values of the flow parameters $S_{wi}(V)$ and $S_{orw}(V)$ for an intermediate salinity value can be determined by use of an interpolation function of the type:

$$G(V)=[F(V)]^{\beta_G}G^{mod}+(1-[F(V)]^{\beta_G})G^{ini} \qquad (1)$$

with $G(V)=\{S_{wi}(V), S_{orw}(V)\}$, and the values of the flow parameters $k_{rw}(V,S)$, $k_{ro}(V,S)$ and $P_{cow}(V,S)$ for an intermediate salinity value can be determined with an interpolation function:

$$G(S,V)=[F(V)]^{\beta_G}G^{mod}(\overline{S})+(1-[F(V)]^{\beta_G})G^{ini}(\overline{S}) \qquad (2)$$

with $G(S,V)=\{krw(S,V), kro(S,V), Pcwo(S,V)\}$, $\overline{S}$ being the normalized saturation between 0 and 1, the water-oil capillary pressure being defined as the pressure difference between the two phases at a given saturation, with $Pc_{ow}=P_o-P_w=Pc_{ow}(S)$.

According to this implementation of the invention, the constants of the representative model of the flow parameters evolution as a function of salinity to be calibrated are, for each flow parameter, the constants relative to salinity $G^{mod}$ and $G^{ini}$ and exponent $\beta_G$.

Such a model is for example implemented in the flow simulation software PumaFlow® (IFP Energies nouvelles, France). According to a variant embodiment of the invention, a model as described by Equations (1) and (2) above is used, but where exponents $\beta_G$ are equal to 1. Such a model is for example described in the document (Jerauld et al., 2008). A model using exponents $\beta_G$ different from 1 however enables more precise adjustment of the laboratory measurements which provides a more reliable model to be determined. Furthermore, a model allowing representation of salinity not only by the salt concentration but also by the ionic strength allows, in some cases, obtaining a better represent the physical mechanism controlling the effects of salinity.

Thus, the method according to the invention comprises a step of calibrating the constants of the representative model of the flow parameters evolution as a function of salinity, from measurements performed in the laboratory on a rock sample of the geological reservoir being studied, then a step of numerical simulations are carried out from this calibrated model at the scale of a rock sample to determine the microscopic residual oil saturation for different salinities. The optimal salinity of an aqueous solution to be injected into the geological reservoir being studied for exploiting the hydrocarbons therein is then determined by use of numerical simulations achieved at the reservoir scale, from this calibrated model and the microscopic residual oil saturation values for the different salinities.

The method according to the invention comprises at least the following steps:

1. Oil production and pressure drop measurements for a plurality of salinities
2. Capillary pressure curve measurements for a plurality of salinities
3. Calibration of the representative model of the flow parameters evolution as a function of salinity
4. Numerical flow simulations for a plurality of salinities with/without capillary effects
5. Determining the microscopic residual oil saturation for the plurality of salinities
6. Exploiting the hydrocarbons of the formation.

When the representative model of the evolution of flow parameters as a function of salinity comprises a parameter corresponding to the irreducible water saturation $S_{wi}$, a preliminary step 0 which measures for a plurality of salinities, the irreducible water saturation $S_{wi}$. The method according to the invention is described hereafter in this more general case, but the method according to the invention can just as well be applied without taking into account the impact of salinity on the irreducible water saturation $S_{wi}$.

Furthermore, the method according to the invention is described hereafter in the case where parameter V representative of the salinity of a solution corresponds to the concentration Sal of salts present in the solution. However, parameter V representative of the salinity of a solution can just as well correspond to the composition of the ions present in the solution.

0. Irreducible Water Saturation Measurements for the Salinities

In this step, which is optional, irreducible water saturation $S_{wi}$ measurements are performed for the salinity values, and at least for the initial and modified salinity values.

According to an implementation of the invention, these measurements are performed on a single rock sample representative of the geological reservoir being studied, which are restored to the initial state as described above between each injection with a different salinity. Alternatively, these measurements are carried out on a different sample for each salinity, after the samples have been previously restored to their initial state as described above.

According to a design of the invention, to perform these measurements, the vacuum sample of pore volume VP is saturated with water at a given salinity, then the water in place in this sample is displaced by oil by use of an injection pump or by centrifuging in oil, and the volume of water produced $E_{prod}$ is measured. An irreducible water saturation $S_{wi}$ is then determined for the salinity value being considered, with a formula:

$$S_{wi} = \frac{VP - E_{prod}}{VP}.$$

After this optional step, an irreducible water saturation value $S_{wi}$ is obtained for each salinity value, and at least for the initial and modified salinity values.

1. Oil Production and Pressure Drop Measurements for a Plurality of Salinities

Oil production and pressure drop laboratory measurements are performed in this step for the salinity values, and values of parameters $G=\{S_{orw}, k_{rw}, k_{ro}\}$ are determined from these measurements for at least the initial and modified salinity values.

In this step, aqueous solutions, which are characterized by at least two different salinity values, are injected into at least one rock sample taken from the geological reservoir being studied, and the evolution of oil production at the sample outlet and the pressure drop (which is a pressure difference between the upstream end and the downstream end of the rock sample being considered, measured by use of a pressure sensor for example) is measured for each of the salinity values.

According to an implementation of the invention, these measurements are performed on a single rock sample representative of the geological reservoir being studied which is restored to its initial state as described above between each injection at a different salinity. Alternatively, these measurements are carried out on a different sample for each salinity, after the samples have been previously restored to their initial state as described above.

According to an implementation of the invention, aqueous solution samples which are characterized by different salinities are first prepared, and the injection sequence with the aqueous solution sample with the highest salinity, referred to as initial salinity, is started. Advantageously, the first solution injected according to this injection sequence has a salinity approaching that of the brine available near the geological reservoir being studied (seawater for example). Solutions with distinct salinities, obtained either by successive dilutions (salt concentration divided by 2, then by 10, by 20, by 100 for example) or by change in the composition of some ions (divalent ions replaced by monovalent ions for example), are then successively injected.

According to an implementation of the invention, aqueous solutions having two distinct salinity values, which are referred to as described above by way of non-limitative example, as the initial salinity value and modified salinity value, are injected. The initial salinity is the higher of the two salinity values. This implementation of the invention allows calibration of simple representative models according to which the flow parameters vary linearly as a function of salinity (see Equations 1 and 2 described above, where the value of exponents $\beta_G$ is 1).

According to a preferred implementation of the invention, aqueous solutions having three distinct salinity values, which are referred to, as described above by way of non-limitative example, as the initial salinity, the modified salinity and the intermediate salinity, are injected. The intermediate salinity is between the initial salinity and the modified salinity. This implementation of the invention allows calibration of more precise representative models according to which the flow parameters vary not only linearly as a function of salinity (see Equations 1 and 2 described above, where the value of exponents $\beta_G$ can be different from 1).

Advantageously, the number of injections at different salinities is preferably 5. Indeed, such a number of injections allows determination of representative models of the flow parameters evolution as a function of salinity in an even more realistic manner than in the embodiment described above.

According to the invention, the values of the flow parameters $G=\{S_{orw}, k_{rw}, k_{ro}\}$, as defined by Equations (1) and (2) above, are then determined, from these measurements, for at least the modified salinity value and the initial salinity value.

According to an implementation of the invention, a value is determined for the average apparent residual oil saturation, denoted by $S_{orw}^{carotte}$, for a given salinity value, from the measurement of the total oil production collected at the core sample outlet for the salinity, with a formula:

$$S_{orw}^{carotte} = \frac{H_{ini} - H_{prod}}{VP} \quad (3)$$

where $H_{ini}$ designates the volume of oil initially in place in the core sample (volume measured during the saturation of the sample in step 1: $H_{ini}=(1-S_{ini})VP$), $H_{prod}$ designates the volume of oil recovered (produced) at the sample outlet, and VP is the pore volume of the core sample.

According to an implementation of the invention, the oil and water permeabilities $k_{rw}$ and $k_{ro}$ are determined for a salinity value by using a representation of the relative permeabilities according to power functions of the normalized saturation. More precisely, for a given phase p (p='w' (for water) or 'o' (for oil)), the relative permeability $k_{rp}$ is defined with a formula $kr_p(S)=kr_{pmax}(\overline{S})^{\alpha_p}$, where $\alpha_p$ is an exponent for phase p, $$\overline{S} = \frac{S_w - S_{wi}}{1 - S_{wi} - S_{orw}}$$

is the normalized saturation, and $kr_{pmax}$ is a constant for phase p. According to this implementation of the invention, constants $kr_{pmax}$ and $\beta_p$ (p=w, o) can be determined as follows:

the maximum relative oil permeability at the irreducible water saturation and the maximum relative water permeability measured at the end of the water injection are determined from the pressure difference measurements between the upstream end and the downstream end of the sample (with the pressure drop) for a given salinity, and by applying the generalized Darcy's law, with a formula:

$$kr_{wmax}(Sal) = kr_w(S_w = 1 - S_{orw}(Sal)) = \frac{\mu_w Q_w L}{AK\Delta P_w(Sal)}$$

$$kr_{omax}(Sal) = kr_o(S_o = 1 - S_{wi}(Sal)) = \frac{\mu_o Q_o L}{AK\Delta P_o(Sal)}$$

where L, A, K, $Q_w$, $Q_o$, $\Delta P_w(Sal)$, $\Delta P_o(Sal)$ respectively designate the length of the core sample, its section, its single-phase permeability, the water injection rate, the oil injection rate, the pressure difference between the inlet and the outlet of the sample after injection of water at a given salinity Sal, and the pressure difference between the inlet and the outlet of the sample after oil accumulation (initial oil and irreducible water saturation phase described at the beginning of this step 1). $kr_{wmax}(Sal)$ is thus deduced from the measurement $\Delta P_w(Sal)$ at the end of each injection at a given salinity and, in particular, of the two injection steps at initial and modified salinity, while $kr_{omax}(Sal)$ is deduced from the measurements of $\Delta P_o(Sal)$ at the end of the accumulation of oil and irreducible water at initial ($Sal_{ini}$) and modified ($Sal_{mod}$) salinities, the exponent $\alpha_p$ of the above power law (with $kr_p(S)=kr_{pmax}(\overline{S})^{\alpha_p}$) models the evolution of shape of the curves, with the evolution being from 0 to $kr_{wmax}$ or $kr_{omax}$ as a function of saturation at a given salinity. According to an implementation of the invention, $\alpha_p$ can be estimated from already existing curves relative to the geological reservoir studied, to the geological reservoir being studied or obtained from a geological analog. According to an implementation of the invention, if such curves are not available, exponent $\alpha_p$ can be calibrated from the adjustment by numerical simulation of the measurements performed in step 1 (with oil production and pressure drop measurements) of the first water injection at initial salinity, which brings the sample from water saturation $S_{wi}$ to the maximum water saturation for this salinity, with $S_w = 1 - S_{orw}$ ($Sal_{ini}$). Such a simulation can be performed using the two-phase flow simulator used in step 4 described hereafter, or any other conventional two-phase flow simulator that does not take salinity into account.

Table 1 gives, by way of illustration, the evolution of the residual oil saturations (in pore volume percentage, % VP), denoted by $S_{orw}^{carotte}$ hereafter, observed at core scale after 5 successive injections of a progressively diluted seawater with the different salinity values resulting from different salt concentrations Sal (in ppm). These results, which are available from the document (Yousef et al., 2011), originate from oil recovery measurements on a 16.2-cm long composite core sample representative of a carbonate reservoir with the initial oil saturation being 89.6% VP (irreducible brine saturation equal to 10.4% VP). Approximately 10 brine pore volumes were injected in each of the 5 injection steps at a given salinity, at a flow rate of 1 cm³/min, which is increased to 2 and then 4 cm³/min at the end of the step. It is observed that the residual oil saturation $S_{orw}^{carotte}$ determined from the oil production measurements at the sample outlet decreases as a function of the injection water salinity, but it remains constant for dilution coefficients equal to or greater than 20. It therefore seems unnecessary to model the impacts of salinity for salinity values below 2,883 ppm. Thus, for this implementation example, $Sal_{ini}=57,670$ and $Sal_{ini}=2,883$ was considered.

TABLE 1

| Sal (ppm) | $S_{orw}^{carotte}$ (% VP) |
|---|---|
| 57,670 | 29.5 |
| 28,835 | 23.3 |
| 5,767 | 15.1 |
| 2,883 | 13.5 |
| 577 | 13.5 |

2. Capillary Pressure Curve Measurements for Salinities

Capillary pressure curves relative to water and oil are measured in this step for salinity values, and at least for the initial and modified salinity values, and values of flow parameters $P_{cow}$ are determined from these measurements for at least the initial and modified salinity values.

According to an implementation of the invention, these measurements are performed on a single rock sample representative of the geological reservoir being studied, which then requires restoration to its initial state as described above between each injection at a different salinity. Alternatively, the capillary pressure measurements are carried out on a different sample for each salinity, after the samples have been previously restored to their initial state as described above.

According to an implementation of the invention, for a given salinity Sal, capillary pressure measurements are performed for different saturation values distributed over a saturation range [$S_{wi}$(Sal), $1-S_{orw}$(Sal)] according to the following two steps:

spontaneous imbibition of the oil and irreducible water saturated sample is performed in the saturation water being considered, for the salinity value being considered. More precisely, the saturated sample is submerged in the water and the oil production is measured as a function of time for this salinity value. This imbibition is numerically simulated by use of a flow simulator such as the PumaFlow® software and the capillary pressures $Pc_{ow} = P_o - P_w = Pc_{ow}(S)$ are adjusted for the values of S covering the saturation variation range, forced imbibition is performed by subjecting the sample at the end of the spontaneous imbibition step to centrifuging which allows, by measuring the expelled oil for a given centrifuge speed, to determine the saturation of the sample for the capillary pressure value applied by this centrifuge rotational speed. A point of the capillary pressure curve $Pc_{ow}(Sw)$ is thus measured, for the set saturation S such that $S_w > S_w(Pc_{ow}=0)$, knowing that $Sw(Pcow=0)$ is the maximum water saturation value obtained with spontaneous imbibition. By repeating the measurement for different increasing values of the centrifuge rotational speed, just as many measurements allowing to sample the negative part of the curve $Pc_{ow}(Sw)$, and notably the saturation interval [$S_w(Pc_{ow}=0)$, $1-S_{orw}$(Sal)], are obtained.

A capillary pressure curve as a function of saturation is obtained at the end of these two steps which are applied for each salinity value, including at least initial and modified salinity values.

According to an implementation of the invention, when the capillary pressure curves have been measured for the initial and modified salinity values only, the capillary pressure curves thus measured can be interpolated to determine capillary pressure curves for the other salinity values of the plurality of salinity values.

3. Calibration of the Representative Model of the Flow Parameters Evolution as a Function of Salinity This step calibrates, from the measurements performed in steps 1 and 2, the representative model of the flow parameters evolution as a function of the salinity of an aqueous solution injected into the geological reservoir being studied, such as the model described above by Equations (1) and (2).

According to an implementation of the invention where the flow simulator which is used is based on a description of the flow parameters defined according to Equations (1) and (2) with exponents $\beta_G=1$, and $G=\{S_{wi}, S_{orw}, k_{rw}, k_{ro}, P_{cow}\}$, the terms $G^{mod}$ and $G^{ini}$ defined in Equations (1) and (2) are assigned the values measured for the modified and initial salinity values respectively in steps 0 and 1 for each one of these parameters $G=\{S_{wi}, S_{orw}, k_{rw}, k_{ro}, P_{cow}\}$. The embodiment of the invention thus requires that the measurements of step 1 described above comprise at least injections of aqueous solutions at initial and modified salinities.

According to an implementation of the invention where the flow simulator used is based on a description of the flow parameters defined according to Equations (1) and (2) with exponents $\beta_G$ different from 1, with $G=\{S_{wi}, S_{orw}, k_{rw}, k_{ro}, P_{cow}\}$, the terms $G^{mod}$ and $G^{ini}$ defined in Equations (1) and (2) are assigned the values measured for the modified and initial salinity values respectively in steps 0 and 1 for each one of these parameters $G=\{S_{wi}, S_{orw}, k_{rw}, k_{ro}, P_{cow}\}$. Furthermore, a value can be determined for exponent $\beta_G$, with $G=\{S_{wi}, S_{orw}, k_{rw}, k_{ro}, P_{cow}\}$, from the values measured for the initial, modified and intermediate salinity values in step 1 for each one of these parameters. This implementation of the invention thus requires that the measurements of steps 0 and 1 described above comprise at least injections of aqueous solutions at initial, modified and intermediate salinities.

According to a first variant of the invention, the exponent $\beta_G$ relative to the residual oil saturation can be determined in this step with a formula as follows:

$$\beta_{Sorw} = \frac{\mathrm{Ln}\left[\dfrac{S_{orw}^{carotte}(Sal) - S_{orw}^{carotte}(Sal_{ini})}{S_{orw}^{carotte}(Sal_{mod}) - S_{orw}^{carotte}(Sal_{ini})}\right]}{\mathrm{Ln}\left[\dfrac{Sal_{ini} - Sal}{Sal_{ini} - Sal_{mod}}\right]} \quad (3)$$

According to a second variant of the invention, advantageously implemented when the capillary effects are significant, the value of 1 is first assigned in step 3 to exponent $\beta_G$ relative to the residual oil saturation and a value is determined for exponent $\beta_G$ relative to the residual oil saturation in step 5, as described hereafter.

According to an implementation of the invention, exponent $\beta_{kro}$ can be determined with a formula similar to that of Equation (3) where measurement $S_{orw}^{carotte}$ is replaced by $k_{rwmax}$ (as determined from the measurement of $\Delta P_w$ at the salinity considered), with a formula:

$$\beta_{krw} = \frac{\mathrm{Ln}\left[\dfrac{k_{rwmax}(Sal) - k_{rwmax}(Sal_{ini})}{k_{rwmax}(Sal_{mod}) - k_{rwmax}(Sal_{ini})}\right]}{\mathrm{Ln}\left[\dfrac{Sal_{ini} - Sal}{Sal_{ini} - Sal_{mod}}\right]} \quad (4)$$

According to an implementation of the invention, the value of 1 is assigned to parameters $\beta_{kro}$, $\beta_{Pcow}$ and $\beta_{Swi}$. Indeed, selection of the values of exponents $\beta_{kro}$, $\beta_{Pcow}$ and $\beta_{Swi}$ has no affect on the modelling as a function of the salinity of the final oil saturation state quantified by $S_{orw}$ (it is noted that $S_{orw}$ is determined from the oil recovery measurement at the sample outlet at the end of the injection step at the salinity being considered), or on the modelling of the pressure difference between the upstream end and the downstream end of the core sample at the end of the injection step at the salinity being considered. Alternatively, selection of the values for exponents $\beta_{kro}$, $\beta_{Pcow}$ and $\beta_{Swi}$ can optionally be subjected to subsequent adjustments with simulations being intended to replicate the "transient" measurements acquired before the stationary measurements obtained at the end of the injection step at a given salinity.

Advantageously, if capillary pressure curves are available for intermediate salinities between the initial salinity and the modified salinity (obtained with measurements or by interpolation as described in step 2 above), values can be determined for $\beta_{Pcow}$ with a formula:

$$\beta_{Pcow} = \frac{\mathrm{Ln}\left[\dfrac{Pc_{ow}(Sal) - Pc_{ow}(Sal_{ini})}{Pc_{ow}(Sal_{mod}) - Pc_{ow}(Sal_{ini})}\right]}{\mathrm{Ln}\left[\dfrac{Sal_{ini} - Sal}{Sal_{ini} - Sal_{mod}}\right]}. \quad (5)$$

According to an embodiment of the invention, different values of $\beta_{Pcow}$ can be determined by use of measurements of $P_{cow}$ acquired for different saturation values, from which a representative average value can be defined.

Thus, at the end of this step, a representative model of the evolution of flow parameters as a function of salinity as described by Equations (1) and (2) above is obtained and calibrated by:

in the case of flow parameters $G=\{S_{wi}, S_{orw}, k_{rw}, k_{ro}\}$, the values of constants $G^{mod}$ and $G^{ini}$ from the measurements described in steps 0 and 1, and preferably when measurements have been performed for at least three salinity values, by the values of exponents $\beta_{Sorw}$ and $\beta_{krw}$ being determined as described above. Advantageously, the model is also parametrized by exponents $\beta_G$ different from 1 for $G=\{S_{wi}, k_{ro}\}$, and determined as described above, in the case of flow parameter $G=P_{cow}$ the values of constants $G^{mod}$ and $G^{ini}$ are determined from the measurements described in step 2 above and, as the case may be, if measurements have been performed for at least three salinity values, by the value of exponent $\beta_{Pcow}$.

4. Numerical Flow Simulations for Salinities with or without Capillary Effects

Numerical simulations simulating injections of aqueous solutions at different salinities in a rock sample, with and without capillary effects, for at least the initial and modified salinity values, are carried out in this step by use of the flow simulator including the calibrated model as described above. Thus, the simulations of this step are achieved at the core sample scale.

More precisely, the following simulations are carried out for each of the salinity values and at least for the initial and modified salinity values:

a first numerical simulation where the capillary effects (with $P_{cow}=0$) are cancelled for the salinity being considered. This first simulation provides a first value, $S_{orw}^{SIM}$, for the average oil saturation of the core sample at the end of each injection step for the salinity value being considered. It is noted that this first simulated value of the average oil saturation at the end of the step coincides with the oil saturation $S_{orw}^{carotte}$ measured at core scale from oil production data (and referred to as experimental apparent residual saturation hereafter) for the salinity values for which measurements have been performed in step 1, since the model is calibrated from these measurements, with $S_{orw}^{SIM}=S_{orw}^{carotte}$. It is also equivalent to a simulated (microscopic) residual saturation because capillarity has been disregarded in this simulation, which differs from the (experimental microscopic) residual saturation that is sought, a second numerical simulation where the capillary effects are taken into account (with the model accounting for the evolution of $P_{cow}$ as a function of salinity as determined at the end of steps 2 and 3 above), which provides a second value, $S_{orw}^{carotte-SIM}$, for the average oil saturation of the core sample at the end of each injection step for a given salinity value. This second simulated value of the average oil saturation (at the salinity being considered) no longer corresponds to a (microscopic) residual oil saturation and its value differs from the measured apparent residual saturation (at core scale) as a result of the more or less pronounced capillary effects which are accounted for in the simulation, which is why it is also referred to as simulated apparent residual saturation.

Advantageously, the two numerical simulations described above are performed at different salinity values, in addition to the values of the two initial and modified salinity values. Indeed, the calibrated model allows prediction of the true (microscopic) residual saturation values for different salinity values, and notably intermediate salinity values.

5. Determining the Microscopic Residual Oil Saturation for the Plurality of Salinities This determines, for each of the salinity values for which a simulation has been performed in step 4 above, the microscopic residual oil saturation values $S_{orw}$, from the simulated values of the average oil saturation $S_{orw}^{carotte\text{-}SIM}$ (simulated apparent residual saturation) obtained by accounting for the capillary effects and the simulated values of the average oil saturation $S_{orw}^{SIM}$ (equal to the experimental apparent residual saturation values $S_{orw}^{carotte}$) obtained without accounting for the capillary effects with a formula:

$$S_{orw} = \frac{(2S_{orw}^{SIM} - S_{orw}^{carotte\text{-}SIM})(1 - S_{wi}) - (S_{orw}^{SIM})^2}{\left(1 - S_{wi} - S_{orw}^{carotte\text{-}SIM}\right)},$$

where the saturations are given between 0 and 1. The residual oil saturation variation is simulated by integrating the capillary pressures measured in step 2, which are normalized in the simulated oil saturation variation range $[S_{orw}^{SIM}(=S_{orw}^{carotte}), 1-S_{wi}]$, is the same as the measured residual oil saturation variation normalized in the true oil saturation variation range $[S_{orw}, 1-S_{wi}]$.

According to a second variant of the invention, the value of exponent $\beta_{Sorw}$ involved in Equation (1) described above is determined for $G=S_{orw}$ in the present step (and not in step 3), in particular if the capillary effects are assumed to play an important role. According to this variant, step 4 is carried out with $\beta_{Sorw}=1$ and $\beta_{Sorw}$ is determined by use of the values of $S_{orw}$ determined in the present step, with:

$$\beta_{Sorw} = \frac{Ln\left[\frac{S_{orw}(Sal) - S_{orw}(Sal_{ini})}{S_{orw}(Sal_{mod}) - S_{orw}(Sal_{ini})}\right]}{Ln\left[\frac{Sal_{ini} - Sal}{Sal_{ini} - Sal_{mod}}\right]}.$$

6. Exploiting the Hydrocarbons of the Formation

This step determines at least one development scheme for the hydrocarbons contained in the formation, from the microscopic residual oil saturations determined for at least two salinity values as described above, by use of a flow simulator including the calibrated model as described above. In the case of this step, the flow simulator is used at the reservoir scale, with it being used to simulate flows in the geological reservoir being studied (and not in a rock sample as described in step 4).

In general terms, a development scheme comprises a number, a geometry and a location (position and spacing) for the injection and production wells. A hydrocarbon development scheme however also comprises the definition of a recovery type (water flooding, gas flooding, polymer flooding, etc.). In the case of the present invention, which relates to enhanced hydrocarbon recovery by injection of a saline aqueous solution, selection of a development scheme comprises selecting a salinity for the aqueous solution to be injected, which can itself be defined by a salt concentration and/or an ionic composition.

Conventionally, various development schemes for exploiting a geological reservoir are evaluated with a flow simulator, and a scheme meeting at least one predetermined criterion is selected. An optimal hydrocarbon reservoir development scheme can for example enable a high rate of recovery of the hydrocarbons trapped in the geological reservoir, over a long development duration, requiring a limited number of wells.

The flow simulator according to the invention, which is calibrated as described above that accounts for the microscopic residual oil saturation values determined as described above, allows the model to impact the salinity that is used for the recovery of the oil in place in a geological reservoir.

Such a flow simulator is conventionally a computer-implemented software. An example of a flow simulator (also referred to as reservoir simulator) for impacting of salinity on flows to be accounted for is the PumaFlow® software (IFP Energies nouvelles, France). According to the invention, at any time t of the simulation, the flow simulator solves all of the flow equations specific to each grid cell and delivers values solutions to the unknowns (saturations, pressures, concentrations, temperature, etc.) predicted at this time t. This solution provides knowledge of the amounts of oil produced and of the state of the reservoir (distribution of pressures, saturations, etc.) at the time considered.

The flow simulator according to the invention notably includes the initial and modified salinity values, and for each of these two salinity values, at least values of the flow parameters $G=\{S_{wi}, S_{orw}, k_{rw}, k_{ro}, P_{cow}\}$ for these two salinity values, as well as the values of exponents $\beta_G$ determined as the case may be and whose default value is 1.

According to an embodiment of the invention, various development schemes are defined for the hydrocarbons of the formation being studied, comprising notably aqueous solution injections at different salinities, and the flows in the geological reservoir being studied are simulated for at least these different salinities. At least one criterion is defined, such as the amount of hydrocarbons produced according to each of the various development schemes and the representative curve of the evolution of production over time in each well, etc. The finally selected development scheme can then correspond to the one meeting at least one of the evaluation criteria of the various development schemes.

Then, once the development scheme selected, the hydrocarbons trapped in the formation are exploited in accordance with this development scheme, notably by injecting the aqueous solution having the salinity as selected above, by drilling the injection and production wells of the development scheme which are determined, so as to produce the hydrocarbons, and by setting up the production infrastructures required for development of the reservoir.

It is understood that the development scheme can evolve over the duration of the exploitation of a geological reservoir, according to reservoir-related knowledge acquired during development, or to improvements in the various technical fields involved in the exploitation of a hydrocarbon reservoir (advancements in the field of drilling, of enhanced oil recovery for example).

Equipment and Computer Program Product

It is clear that the method according to the invention comprises steps carried out with equipment (a computer workstation for example) comprising data processing capability (a processor) and data storage (a memory, in particular a hard drive), as well as an input-output interface that inputs data and outputs the results of the method.

In particular, the data processing is configured to carry out steps 4 and 6 described above, using steps requiring a numerical flow simulator.

Furthermore, the invention relates to a computer program product downloadable from a communication network and/or recorded on a computer readable medium and/or processor executable, comprising program code instructions for implementing the method as described above, when the program is executed by a processor of a computer.

Example Embodiment

The features and advantages of the method according to the invention will be clear from reading the application example hereafter.

For this application example, the method according to the invention is applied for modelling injection tests with progressively diluted seawater whose results are given in Table 1, and are as described in the document (Youssef et al., 2011).

Capillary pressure curves are further measured in this application case, for the initial and modified salinity values only. FIG. 1 shows examples of capillary pressure curves, at initial salinity (represented by diamonds) and modified salinity (represented by squares) as a function of saturation Sw (in % VP).

The values of exponents $\beta_{Sorw}$ are determined for each of the Sony intermediate salinities as described in step 3 above. The values of the exponents thus determined are 1.48 and 1.95 respectively. A value of $\beta_{Sorw}$ provided at the simulator input, ranging between 1.5 and 2, must therefore allow to correctly predict the experimental value $S_{orw}^{carotte}$ of $S_{orw}$. By way of illustration, we give in Table 2 the numerically simulated values obtained by disregarding the capillary pressure (first numerical simulation of step 4) for $\beta_{Sorw}$ equal to either 1 or 2. It is observed that the Sony model predictions are globally better with $\beta_{Sorw}=2$ than with $\beta_{Sorw}=1$. More precisely:

for the salinity 5,767 ppm, with exponent $\beta_{Sorw}=2$, the model predicts quasi exactly the measured residual oil saturation as expected (because the precalculated value of $\beta_{Sorw}$, 1.95, is very close to 2), for the salinity 28,835 ppm, the residual saturation values predicted by the model, with $\beta_{Sorw}=2$ and $\beta_{Sorw}=1$, bound the measured residual oil saturation, also as expected (because the precalculated value of $\beta_{Sorw}$, 1.48, is intermediate between 1 and 2).

TABLE 2

| Sal (ppm) | Sorw experimental, (% VP) | Sorw Simulated with $\beta_{Sorw}=1$, (% VP) | Sorw Simulated with $\beta_{Sorw}=2$, (% VP) |
|---|---|---|---|
| 28,835 | 23.3 | 21.22 | 25.21 |
| 5,767 | 15.1 | 14.34 | 15.14 |

Steps 3 to 5 of the method according to the invention are illustrated hereafter for the initial salinity value only.

The representative model of the flow parameters evolution as a function of salinity is calibrated as described in step 3, more precisely according to the second variant described in this step (in other words, a value of 1 is assigned to exponent $\beta_{Sorw}$).

A numerical simulation of water injection at initial salinity is then performed by accounting for of the capillary pressure.

As expected, the apparent residual saturation simulated at core scale $S_{orw}^{carotte-SIM}$ is no longer 29.5% VP, but 32.6% VP due to the capillary retention of oil in the sample.

The true microscopic residual saturation is then calculated from values $S_{orw}^{carotte}=29.5\%$ VP, $S_{orw}^{carotte-SIM}=32.6\%$ VP and $S_{wi}=10.4\%$ VP according to the correction formula specified in step 5, with:

$$S_{orw} = \frac{(2*0.295 - 0.326)(1 - 0.104) - (0.295)^2}{(1 - 0.104 - 0.326)} = 0.262( = 26.2\% \ VP).$$

It is noted that, when selecting the apparent residual saturation measured from the production data at the sample outlet, the error made on the true residual oil saturation exceeds 3% PV (29.5−26.2=3.3% VP), which is considerable in terms of recovery efficiency prediction. This difference results from the oil retention in the core sample (equal to 32.6−29.5=3.1% VP).

It is important to correct these residual oil saturation measurements because the common use of short-length cores increases the relative amount of oil retained by capillarity at the outlet of non-water wet cores. This therefore justifies the necessity of integrating steps 2 to 5 in the salinity evaluation and optimization of an injection water.

The reliable residual oil saturation values which are predicted for different salinities allow determination of an injection salinity enabling optimal exploitation of the hydrocarbons present in a geological reservoir, which for example use a salinity value for achieving a low residual oil saturation associated with acceptable desalination costs.

The invention claimed is:

1. A method for recovery of hydrocarbons present in a geological reservoir by injecting a saline aqueous solution into the reservoir using a numerical flow simulator including a representative model of evolution of flow parameters as a function of salinity of the injected aqueous solution, the flow parameters comprising at least residual oil saturation, relative water permeability, relative oil permeability and capillary pressure, with the model being a function of constants relative to each of the parameters, comprising steps of:

A—restoring at least one sample representative of the reservoir to its initial state, calibrating the model with steps of:
  i. injecting into the sample at least two aqueous solutions having different salinity values and measuring at least an oil production and a pressure drop for each of the salinity values;
  ii. performing capillary pressure measurements for each of the salinity values;
  and
  iii. determining from the measurements constants of the model relative to each of the parameters;

B—determining with the numerical simulator including the calibrated model, a microscopic residual oil saturation value for the salinity values by performing steps for each of the salinity values of:
  iv. carrying out a first simulation of an injection of the aqueous solution for the salinity value in the sample, the model being used for the first simulation with a zero capillary pressure, and determining a first value of the residual oil saturation for the salinity value of the sample;
  v. performing a second simulation of an injection of an aqueous solution for the salinity value in the sample, and determining a second value of the residual oil saturation for the salinity value of the sample;
  vi. determining at least from the first and second residual oil saturation values simulated for the salinity value, a value of the microscopic residual oil saturation for the salinity value; and C—determining a development scheme for the reservoir from the flow simulator including the calibrated model and the microscopic residual oil saturation values for at least the salinity values, and exploiting the hydrocarbons of the reservoir according to the development scheme including locating and distilling at least one well into the reservoir and removing the hydrocarbons with the at least one well from the reservoir.

2. A method as claimed in claim 1, wherein the model is expressed with a formula:

$$G(V)=[F(V)]^{\beta_G}G^{mod}+(1-[F(V)]^{\beta_G})G^{ini}$$

where G is one of the flow parameters of the model, V is the salinity, $G^{mod}$, $G^{ini}$ and $\beta_G$ are the constants of the model to be calibrated for the parameters, wherein G is also a function of a water saturation when G corresponds to the relative water permeability, the relative oil permeability or the capillary pressure.

3. A method as claimed in claim 1, wherein the microscopic residual oil saturation value $S_{orw}$ for one of the salinity values is determined with a formula:

$$S_{orw} = \frac{(2S_{orw}^{SIM} - S_{orw}^{carotte-SIM})(1-S_{wi}) - (S_{orw}^{SIM})^2}{(1-S_{wi}-S_{orw}^{carotte-SIM})},$$

where $S_{orw}^{SIM}$ is the first residual oil saturation value simulated for the salinity value, $S_{orw}^{carotte-SIM}$ is the second residual oil saturation value simulated for the salinity value, and $S_{wi}$ is an irreducible water saturation.

4. A method as claimed in claim 2, wherein the microscopic residual oil saturation value $S_{orw}$ for one of the salinity values is determined with a formula:

$$S_{orw} = \frac{(2S_{orw}^{SIM} - S_{orw}^{carotte-SIM})(1-S_{wi}) - (S_{orw}^{SIM})^2}{(1-S_{wi}-S_{orw}^{carotte-SIM})},$$

where $S_{orw}^{SIM}$ is the first residual oil saturation value simulated for the salinity value, $S_{orw}^{carotte-SIM}$ is the second residual oil saturation value simulated for the salinity value, and $S_{wi}$ is an irreducible water saturation.

5. A method as claimed in claim 1, wherein the flow parameters further comprise an irreducible water saturation and further performing an irreducible water saturation measurement for each of the salinity values from the sample.

6. A method as claimed in claim 2, wherein the flow parameters further comprise an irreducible water saturation and further performing an irreducible water saturation measurement for each of the salinity values from the sample.

7. A method as claimed in claim 3, wherein the flow parameters further comprise an irreducible water saturation and further performing an irreducible water saturation measurement for each of the salinity values from the sample.

8. A method as claimed in claim 4, wherein the flow parameters further comprise an irreducible water saturation and further performing an irreducible water saturation measurement for each of the salinity values from the sample..

9. A method as claimed in claim 1, wherein the development scheme is determined by evaluating development schemes as a function of at least one predetermined criterion, the evaluation comprising aqueous solution injection simulations for different salinity values in the reservoir, and exploiting the hydrocarbons of the reservoir are exploited according to the scheme which meets the at least one criterion.

10. A method as claimed in claim 2, wherein the development scheme is determined by evaluating development schemes as a function of at least one predetermined criterion, the evaluation comprising aqueous solution injection simulations for different salinity values in the reservoir, and exploiting the hydrocarbons of the reservoir are exploited according to the scheme which meets the at least one criterion.

11. A method as claimed in claim 3, wherein the development scheme is determined by evaluating development schemes as a function of at least one predetermined criterion, the evaluation comprising aqueous solution injection simulations for different salinity values in the reservoir, and exploiting the hydrocarbons of the reservoir are exploited according to the scheme which meets the at least one criterion.

12. A method as claimed in claim 4, wherein the development scheme is determined by evaluating development schemes as a function of at least one predetermined criterion, the evaluation comprising aqueous solution injection simulations for different salinity values in the reservoir, and exploiting the hydrocarbons of the reservoir are exploited according to the scheme which meets the at least one criterion.

13. A method as claimed in claim 5, wherein the development scheme is determined by evaluating development schemes as a function of at least one predetermined criterion, the evaluation comprising aqueous solution injection simulations for different salinity values in the reservoir, and exploiting the hydrocarbons of the reservoir are exploited according to the scheme which meets the at least one criterion.

14. A method as claimed in claim 6, wherein the development scheme is determined by evaluating development schemes as a function of at least one predetermined criterion, the evaluation comprising aqueous solution injection simulations for different salinity values in the reservoir, and exploiting the hydrocarbons of the reservoir are exploited according to the scheme which meets the at least one criterion.

15. A method as claimed in claim 7, wherein the development scheme is determined by evaluating development schemes as a function of at least one predetermined criterion, the evaluation comprising aqueous solution injection simulations for different salinity values in the reservoir, and exploiting the hydrocarbons of the reservoir are exploited according to the scheme which meets the at least one criterion.

16. A method as claimed in claim 8, wherein the development scheme is determined by evaluating development schemes as a function of at least one predetermined criterion, the evaluation comprising aqueous solution injection simulations for different salinity values in the reservoir, and exploiting the hydrocarbons of the reservoir are exploited according to the scheme which meets the at least one criterion.

17. A method as claimed in claim 1, wherein the hydrocarbons of the reservoir are exploited by injecting the saline aqueous solution, drilling at least one injection well and at least one production well of the development scheme of the reservoir, and installing production infrastructures for the development scheme of the reservoir.

18. A method as claimed in claim 2, wherein the hydrocarbons of the reservoir are exploited by injecting the saline aqueous solution, drilling at least one injection well and at least one production well of the development scheme of the reservoir, and installing production infrastructures for the development of the reservoir.

19. A method as claimed in claim 3, wherein the hydrocarbons of the reservoir are exploited by injecting the saline aqueous solution, drilling at least one injection well and at least one production well of the development scheme of the reservoir, and installing production infrastructures for the development of the reservoir.

20. A method as claimed in claim 5, wherein the hydrocarbons of the reservoir are exploited by injecting the saline aqueous solution, drilling at least one injection well and at least one production well of the development scheme of the reservoir, and installing production infrastructures for the development of the reservoir.

21. A method as claimed in claim 9, wherein the hydrocarbons of the reservoir are exploited by injecting the saline aqueous solution, drilling at least one injection well and at least one production well of the development scheme of the reservoir, and installing production infrastructures for the development of the reservoir.

* * * * *